US009542101B2

(12) United States Patent
Simionescu et al.

(10) Patent No.: US 9,542,101 B2
(45) Date of Patent: Jan. 10, 2017

(54) SYSTEM AND METHODS FOR PERFORMING EMBEDDED FULL-STRIPE WRITE OPERATIONS TO A DATA VOLUME WITH DATA ELEMENTS DISTRIBUTED ACROSS MULTIPLE MODULES

(71) Applicant: LSI Corporation, San Jose, CA (US)

(72) Inventors: Horia Simionescu, Foster City, CA (US); Anant Baderdinni, Lawrenceville, GA (US); Luca Bert, Cumming, GA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 411 days.

(21) Appl. No.: 14/033,474

(22) Filed: Sep. 22, 2013

(65) Prior Publication Data
US 2014/0208024 A1    Jul. 24, 2014

Related U.S. Application Data

(60) Provisional application No. 61/755,255, filed on Jan. 22, 2013.

(51) Int. Cl.
*G06F 12/00* (2006.01)
*G06F 3/06* (2006.01)
*G06F 11/10* (2006.01)

(52) U.S. Cl.
CPC ............... *G06F 3/061* (2013.01); *G06F 3/064* (2013.01); *G06F 3/0619* (2013.01); *G06F 3/0659* (2013.01); *G06F 3/0688* (2013.01); *G06F 11/1076* (2013.01); *G06F 2211/1059* (2013.01)

(58) Field of Classification Search
CPC .................. G06F 3/0659; G06F 3/0688; G06F 2211/1059; G06F 11/1076; G06F 3/0619; G06F 3/064; G06F 3/061; G06F 3/0629; G06F 3/0689; G06F 3/0614
See application file for complete search history.

(56) References Cited

U.S. PATENT DOCUMENTS

| 4,092,732 A | | 5/1978 | Ouchi | |
|---|---|---|---|---|
| 6,148,368 A | * | 11/2000 | DeKoning | G06F 12/0866 710/53 |
| 8,484,408 B2 | | 7/2013 | Hetzler et al. | |

(Continued)

OTHER PUBLICATIONS

Mikalauskas, Aurimas, Aligning IO on a hard disk RAID—the Benchmarks, MySQL Performance Blog, Jun. 9, 2011.*

(Continued)

*Primary Examiner* — Hal Schnee
*Assistant Examiner* — Francisco Grullon

(57) ABSTRACT

A data storage system and methods for managing data to be transferred between a host and a data volume distributed across solid state storage modules are disclosed. A storage controller couples the host to the data volume and manages data transfers to and from the logical volume. The storage controller receives a set of parameters that define how an array of blocks and chunks of buffered data will be distributed across solid state storage modules. The storage controller receives and buffers data to be stored and transfers the same when the capacity of the buffered data will fill a set of arranged stripes in the defined array in a single write operation.

17 Claims, 9 Drawing Sheets

(56) References Cited

U.S. PATENT DOCUMENTS

| | | | |
|---|---|---|---|
| 2002/0091903 A1* | 7/2002 | Mizuno | G06F 3/0605 711/154 |
| 2003/0200388 A1* | 10/2003 | Hetrick | G06F 12/0866 711/114 |
| 2008/0040553 A1* | 2/2008 | Ash | G06F 11/1076 711/133 |
| 2008/0091875 A1* | 4/2008 | Mannenbach | G06F 12/121 711/113 |
| 2008/0141043 A1* | 6/2008 | Flynn | G06F 1/183 713/193 |
| 2008/0168304 A1* | 7/2008 | Flynn | G06F 1/183 714/6.12 |
| 2009/0198885 A1* | 8/2009 | Manoj | G06F 3/0613 711/114 |
| 2009/0204846 A1* | 8/2009 | Baloun | G06F 11/1076 714/6.12 |
| 2009/0204872 A1* | 8/2009 | Yu | G06F 3/0613 714/773 |
| 2009/0287956 A1* | 11/2009 | Flynn | G06F 11/1008 714/6.12 |
| 2012/0059978 A1* | 3/2012 | Rosenband | G06F 3/0613 711/103 |
| 2012/0265933 A1* | 10/2012 | Gupta | G06F 3/0689 711/114 |
| 2013/0091237 A1 | 4/2013 | Arulambalam et al. | |

OTHER PUBLICATIONS

Bonwick, Jeff, RAID-Z, Oracle Blog: Jeff Bonwick's Blog, Nov. 17, 2005.*

Disk Alignment, Clariion Blogs, Feb. 12, 2008.*

Lin, Smith, Full-stripe Writes, StoRAID, Jun. 8, 2012.*

Qasdfdsaq, How to achieve superb write speeds with nForce onboard RAID5, Hard Disk Drives (HDD)—Storage Forums, Jul. 31, 2007.*

Sorenson et al., Optimizing RAID Storage Performance with the SAS-based Dell Perc 5, Aug. 2007, Dell Power Solutions, pp. 1-4, Dell Inc.

Unknown, Am I Boring You? Full Stripe Writes and Other Complexity . . . , The Storage Buddhist—We're all only here temporarily, Apr. 27, 2011, available at www.storagebuddhist.wordpress.com/2011/04/27/am-i-boring-you-full-stripe-write-and-other-complexity/.

* cited by examiner

FIG. 4

EIGHT INSTANCES OF EMBEDDED FULL-STRIPE WRITE OPERATIONS OVER EIGHT SSS UNITS

DEFINED ARRAY 400

| SSS Unit | SSS Unit | SSS Unit | SSS Unit | SSS Unit | SSS Unit | SSS Unit | SSS Unit |
|---|---|---|---|---|---|---|---|
| S1.C1 _411_ | S1.C2 _421_ | S1.C3 _431_ | S1.C4 _441_ | S1.P _451_ | S2.C1 _461_ | S2.C2 _471_ | S2.C3 _481_ |
| S2.C4 _412_ | S2.P _422_ | S3.C1 _432_ | S3.C2 _442_ | S3.C3 _452_ | S3.C4 _462_ | S3.P _472_ | S4.C1 _482_ |
| S4.C2 _413_ | S4.C3 _423_ | S4.C4 _433_ | S4.P _443_ | S5.C1 _453_ | S5.C2 _463_ | S5.C3 _473_ | S5.C4 _483_ |
| S5.P _414_ | S6.C1 _424_ | S6.C2 _434_ | S6.C3 _444_ | S6.C4 _454_ | S6.P _464_ | S7.C1 _474_ | S7.C2 _484_ |
| S7.C3 _415_ | S7.C4 _425_ | S7.P _435_ | S8.C1 _445_ | S8.C2 _455_ | S8.C3 _465_ | S8.C4 _475_ | S8.P _485_ |
| _410_ | _420_ | _430_ | _440_ | _450_ | _460_ | _470_ | _480_ |

| 601 SSS Unit | 602 SSS Unit | 603 SSS Unit | 604 SSS Unit | 605 SSS Unit | 606 SSS Unit | 607 SSS Unit | 608 SSS Unit |
|---|---|---|---|---|---|---|---|
| 0.0.0 | 0.0.1 | 0.0.2 | 0.0.3 | 0.0.P | 1.0.0 | 1.0.1 | 1.0.2 |
| 0.1.0 | 0.1.1 | 0.1.2 | 0.1.3 | 0.1.P | 1.1.0 | 1.1.1 | 1.1.2 |
| 0.2.0 | 0.2.1 | 0.2.2 | 0.2.3 | 0.2.P | 1.2.0 | 1.2.1 | 1.2.2 |
| 1.0.3 | 1.0.P | 2.0.0 | 2.0.1 | 2.0.2 | 2.0.3 | 2.0.P | 3.0.0 |
| 1.1.3 | 1.1.P | 2.1.0 | 2.1.1 | 2.1.2 | 2.1.3 | 2.1.P | 3.1.0 |
| 1.2.3 | 1.2.P | 2.2.0 | 2.2.1 | 2.2.2 | 2.2.3 | 2.2.P | 3.2.0 |
| 3.0.1 | 3.0.2 | 3.0.3 | 3.0.P | 4.0.0 | 4.0.1 | 4.0.2 | 4.0.3 |
| 3.1.1 | 3.1.2 | 3.1.3 | 3.1.P | 4.1.0 | 4.1.1 | 4.1.2 | 4.1.3 |
| 3.2.1 | 3.2.2 | 3.2.3 | 3.2.P | 4.2.0 | 4.2.1 | 4.2.2 | 4.2.3 |
| 4.0.P | 5.0.0 | 5.0.1 | 5.0.2 | 5.0.3 | 5.0.P | 6.0.0 | 6.0.1 |
| 4.1.P | 5.1.0 | 5.1.1 | 5.1.2 | 5.1.3 | 5.1.P | 6.1.0 | 6.1.1 |
| 4.2.P | 5.2.0 | 5.2.1 | 5.2.2 | 5.2.3 | 5.2.P | 6.2.0 | 6.2.1 |
| 6.0.2 | 6.0.3 | 6.0.P | 7.0.0 | 7.0.1 | 7.0.2 | 7.0.3 | 7.0.P |
| 6.1.2 | 6.1.3 | 6.1.P | 7.1.0 | 7.1.1 | 7.1.2 | 7.1.3 | 7.1.P |
| 6.2.2 | 6.2.3 | 6.2.P | 7.2.0 | 7.2.1 | 7.2.2 | 7.2.3 | 7.2.P |

| SSS Unit 701 | SSS Unit 702 | SSS Unit 703 | SSS Unit 704 | SSS Unit 705 | SSS Unit 706 | SSS Unit 707 | SSS Unit 708 |
|---|---|---|---|---|---|---|---|
| 0.0.0 | 1.0.0 | 2.0.0 | 3.0.0 | 4.0.0 | 5.0.0 | 6.0.0 | 7.0.0 |
| 0.1.0 | 1.1.0 | 2.1.0 | 3.1.0 | 4.1.0 | 5.1.0 | 6.1.0 | 7.1.0 |
| 0.7.0 | 1.7.0 | 2.2.0 | 3.2.0 | 4.2.0 | 5.2.0 | 6.2.0 | 7.2.0 |
| 7.0.1 | 0.0.1 | 1.0.1 | 2.0.1 | 3.0.1 | 4.0.1 | 5.0.1 | 6.0.1 |
| 7.1.1 | 0.1.1 | 1.1.1 | 2.1.1 | 3.1.1 | 4.1.1 | 5.1.1 | 6.1.1 |
| 7.7.1 | 0.7.1 | 1.2.1 | 2.2.1 | 3.2.1 | 4.2.1 | 6.2.1 | 6.2.1 |
| 6.0.2 | 7.0.2 | 0.0.2 | 1.0.2 | 2.0.2 | 3.0.2 | 4.0.2 | 5.0.2 |
| 6.1.2 | 7.1.2 | 0.1.2 | 1.1.2 | 2.1.2 | 3.1.2 | 4.1.2 | 5.1.2 |
| 6.7.2 | 7.7.2 | 0.2.2 | 1.2.2 | 2.2.2 | 3.2.2 | 4.2.2 | 5.2.2 |
| 5.0.3 | 6.0.3 | 7.0.3 | 0.0.3 | 1.0.3 | 2.0.3 | 3.0.3 | 4.0.3 |
| 5.1.3 | 6.1.3 | 7.1.3 | 0.1.3 | 1.1.3 | 2.1.3 | 3.1.3 | 4.1.3 |
| 5.7.3 | 6.7.3 | 7.2.3 | 0.2.3 | 1.2.3 | 2.2.3 | 3.2.3 | 4.2.3 |
| 4.0.P | 5.0.P | 6.0.P | 7.0.P | 0.0.P | 1.0.P | 2.0.P | 3.0.P |
| 4.1.P | 5.1.P | 6.1.P | 7.1.P | 0.1.P | 1.1.P | 2.1.P | 3.1.P |
| 4.7.P | 5.7.P | 6.2.P | 7.2.P | 0.2.P | 1.2.P | 2.2.P | 3.2.P |

STRIDE 0　　STRIDE 2　　STRIDE 4　　STRIDE 6

SYSTEM AND METHODS FOR PERFORMING EMBEDDED FULL-STRIPE WRITE OPERATIONS TO A DATA VOLUME WITH DATA ELEMENTS DISTRIBUTED ACROSS MULTIPLE MODULES

TECHNICAL FIELD

The invention relates generally to data-storage systems and, more particularly, to a method and system for logically sub-dividing persistent data-storage capacity provided by a set of storage modules.

BACKGROUND

Solid-state storage devices (SSDs) store digital data persistently in an integrated circuit. Data stores that use integrated-circuit (IC) based storage media have comparatively lower access and latency times than data storage devices that rely on magnetic properties of the storage medium to save data. Despite the performance benefits provided by SSDs their relatively higher cost per byte of storage capacity has led to their deployment in cache memory portions of a data store. A cache memory is a main memory locations. As long as most memory accesses are to cached memory locations, the average latency of memory accesses is closer to the cache latency than to the latency of main memory.

Whether deployed in a cache, in a primary data store or a secondary data store, IC based storage media require novel approaches for managing input/output operations and providing data protection while minimizing overhead and communicating data.

A conventional storage array or disk array is a logical data store that includes multiple disk drives or similar persistent storage units. A storage array can use parallel data input/output operations to store and retrieve data more efficiently than when a single disk drive or storage unit alone is used to implement a data store. A storage array also can provide redundancy to promote reliability, as in the case of a Redundant Array of Inexpensive Disks (RAID) system. In general, RAID systems simultaneously use two or more hard disk drives, referred to herein as physical disk drives (PDDs), to achieve greater levels of performance, reliability and/or larger data volume sizes. The acronym "RAID" is generally used to describe data storage schemes that divide and replicate data among multiple PDDs. In RAID systems, one or more PDDs are setup as a RAID virtual disk drive (VDD). In a RAID VDD, data might be distributed across multiple PDDs, but the VDD is seen by the user and by the operating system of the computer as a single data store. The VDD is "virtual" in that storage space in the VDD maps to the physical storage space in the PDDs that make up the VDD. Accordingly, a meta-data mapping table is used to translate an incoming VDD identifier and address location into a PDD identifier and address location.

Although a variety of different RAID system designs exist, all have exhibit one or more of two design goals, namely: (1) to increase data reliability and/or (2) to increase input/output (I/O) performance. RAID has seven basic levels corresponding to different system designs. The seven basic RAID levels, typically referred to as RAID levels 0-6, are as follows. RAID level 0 uses striping to achieve improved data reliability and increased I/O performance. When the data is written, it is fragmented. The term "striped" means that logically sequential data, such as a single data file, is said to be "striped" over multiple PDDs when the data is written. Striping improves performance and provides additional storage capacity. The fragments are written to their respective PDDs simultaneously on the same sector. This allows smaller sections of the entire chunk of data to be read off the PDDs in parallel, providing improved I/O bandwidth. The larger the number of PDDs in the RAID system, the higher the bandwidth of the system, but also the greater the risk of data loss. Parity is not used in RAID level 0 systems, which means that RAID level 0 systems have no fault tolerance. Consequently, when any PDD fails, the entire data storage system fails.

In RAID level 1 systems, mirroring without parity is used. Mirroring corresponds to the replication of stored data onto separate PDDs in real time to ensure that the data is continuously available. RAID level 1 systems provide fault tolerance from disk errors because all but one of the PDDs can fail without causing the system to fail. RAID level 1 systems have increased read performance when used with multi-threaded operating systems, but also have a small reduction in write performance as each data write operation must be replicated across the redundant or mirrored drives.

In RAID level 2 systems, redundancy is used and PDDs are synchronized and striped in very small stripes, often in single bytes/words. Redundancy is achieved through the use of Hamming codes, which are calculated across bits on PDDs and stored on multiple parity disks. If a PDD fails, the parity bits can be used to reconstruct the data. Therefore, RAID level 2 systems provide fault tolerance. In essence, failure of a single PDD does not result in failure of the system.

RAID level 3 systems use byte-level striping in combination with interleaved parity bits and a dedicated parity disk. RAID level 3 systems require the use of at least three PDDs. The use of byte-level striping and redundancy results in improved performance and provides the system with fault tolerance. However, use of the dedicated parity disk creates a bottleneck for writing data due to the fact that every write requires updating of the parity data. RAID level 3 systems can continue to operate without parity and no performance penalty is suffered in the event that the parity disk fails.

RAID level 4 is essentially identical to RAID level 3 except that RAID level 4 systems employ block-level striping instead of byte-level or word-level striping. Because each stripe is relatively large, in some situations a single file can be stored in a block. Each PDD operates independently and many different I/O requests can be handled in parallel. Error detection is achieved by using block-level parity bit interleaving. The interleaved parity bits are stored in a separate single parity disk.

RAID level 5 uses striping in combination with distributed parity. In order to implement distributed parity, all but one of the PDDs must be present for the system to operate. Failure of any one of the PDDs necessitates replacement of the PDD. However, failure of a single one of the PDDs does not cause the system to fail. Upon failure of one of the PDDs, subsequent read requests can be satisfied by determining the entirety of the previously stored information from the distributed parity such that the PDD failure is masked from the end user. If a second PDD fails, the storage system will suffer a loss of data. Thus, before a first failed PDD is replaced and the appropriate data is completely reconstructed, the storage system is vulnerable to potential data loss.

However, there is a performance penalty for the additional fault tolerance as each data write operation requires at least two read operations and two write operations as the data strip to be changed and the parity strip both need to be read and the new data has to be written to the modified strip and the parity strip.

U.S. Pat. No. 4,092,732 describes a method of allocating data sequentially and holding or buffering data until the data to be written matches the data storage capacity of a full stripe of the data store. Other conventional storage systems apply full stripe write I/O operations in arrays of PDDs, and arrays of solid state storage elements. While these methods minimize the total number of I/O operations to the PDDs and the sold state storage elements in the respective arrays, the complexity and costs associated with the storage and management of the temporary data makes this approach suboptimal.

RAID level 6 uses striping in combination with dual distributed parity. RAID level 6 systems require the use of at least four PDDs, with two of the PDDs being used for storing the distributed parity bits. The system can continue to operate even if two PDDs fail. Dual parity becomes increasingly important in systems in which each VDD is made up of a large number of PDDs. Unlike RAID-based storage systems that use single parity, which are vulnerable to data loss until the appropriate data on a failed PDD is rebuilt, in RAID level 6 systems, the use of dual parity allows a VDD having a failed PDD to be rebuilt without risking loss of data in the event that a second PDD fails before completion of the rebuild of the data on the first failed PDD.

The previous summary of RAID levels and variants is incomplete. Many variations of the seven basic RAID levels described above exist. For example, the attributes of RAID levels 0 and 1 may be combined to obtain a RAID level known as RAID level 0+1 or RAID 01. RAID 01 is a mirror of stripes. In other systems the attributes of RAID level 1 and RAID level 0 are reversed forming a stripe of mirrors. Many other variations include other nested combinations of one or more of the seven basic RAID levels.

SUMMARY

The present method and storage controllers implementing the method use solid-state memory units to store data exposed to a host computer as a single logical data volume. Data to be stored is divided into blocks with each block having a consistent size in bytes. The blocks are sub-divided into chunks with each chunk having a consistent size in bytes that is no smaller than the bandwidth of an I/O circuit pipeline that communicates digital data to and from the circuit elements that store the data in the solid state memory units. A storage array arrangement is defined that results in the distribution of chunks in a stripe each having an associated parity chunk. The storage array is further defined by a set of arranged stripes that can be written and accessed in a single operation from the controller. The set of arranged stripes can be leveraged using algorithms in the controller to write significantly more data to the data volume in a single write operation than is possible with stripe writes alone.

An example embodiment of a method includes the steps of defining a layout across a set of N solid state modules; buffering, in a controller, data received from a host that is to be stored in a data volume supported by the set of N solid state modules; determining, with the controller, when an amount of the data to be stored in the data volume is equal to or exceeds the storage capacity of a set of arranged stripes defined in the layout; and when the amount of data to be stored in the data volume is equal to or exceeds the storage capacity of the set of arranged stripes, transferring the data to be stored from the controller to the N solid state modules in a single write operation.

An alternative embodiment of a method includes the steps of receiving, with a storage controller, a set of parameters that define a layout for distributing data across a set of N modules, the layout defining a block and a chunk both the block and the chunk having storage capacities selected as a function of a bandwidth of an I/O circuit pipeline that communicates digital data to and from circuit elements that store the data in solid state memory units in the N modules; buffering, in a cache coupled to the storage controller, data received from a host that is to be stored in a data volume supported by the set of N solid state modules; determining when an amount of the data to be stored in the data volume is equal to or exceeds the storage capacity of a set of arranged stripes defined by the layout; and in response to the determining, transferring the data to be stored from the controller to the N solid state modules in a single write operation.

An example embodiment of a data storage system includes a controller, a cache memory coupled to the controller and a defined array distributed across N solid state storage modules. The controller is supported by processing logic that is configurable to define and manage data transfers to and from a logical volume to be exposed to a host device. The data transfers managed by the controller include data aligned for a single write operation to a set of arranged stripes in the defined array. The cache memory buffers received data intended to be written to the logical volume.

These and other features and advantages of the invention will become apparent from the following description, drawings and claims.

BRIEF DESCRIPTION OF THE DRAWINGS

FIG. 4 illustrates a block diagram of an alternative embodiment of a relatively larger defined array that can be populated with cached data by the storage controller of FIG. 1.

FIG. 6 illustrates a block diagram of an embodiment of a defined array with one example stride allocation arrangement.

FIG. 7 illustrates a block diagram of an embodiment of a defined array with an alternative stride allocation arrangement.

DETAILED DESCRIPTION OF ILLUSTRATIVE EMBODIMENTS

Figure 1:
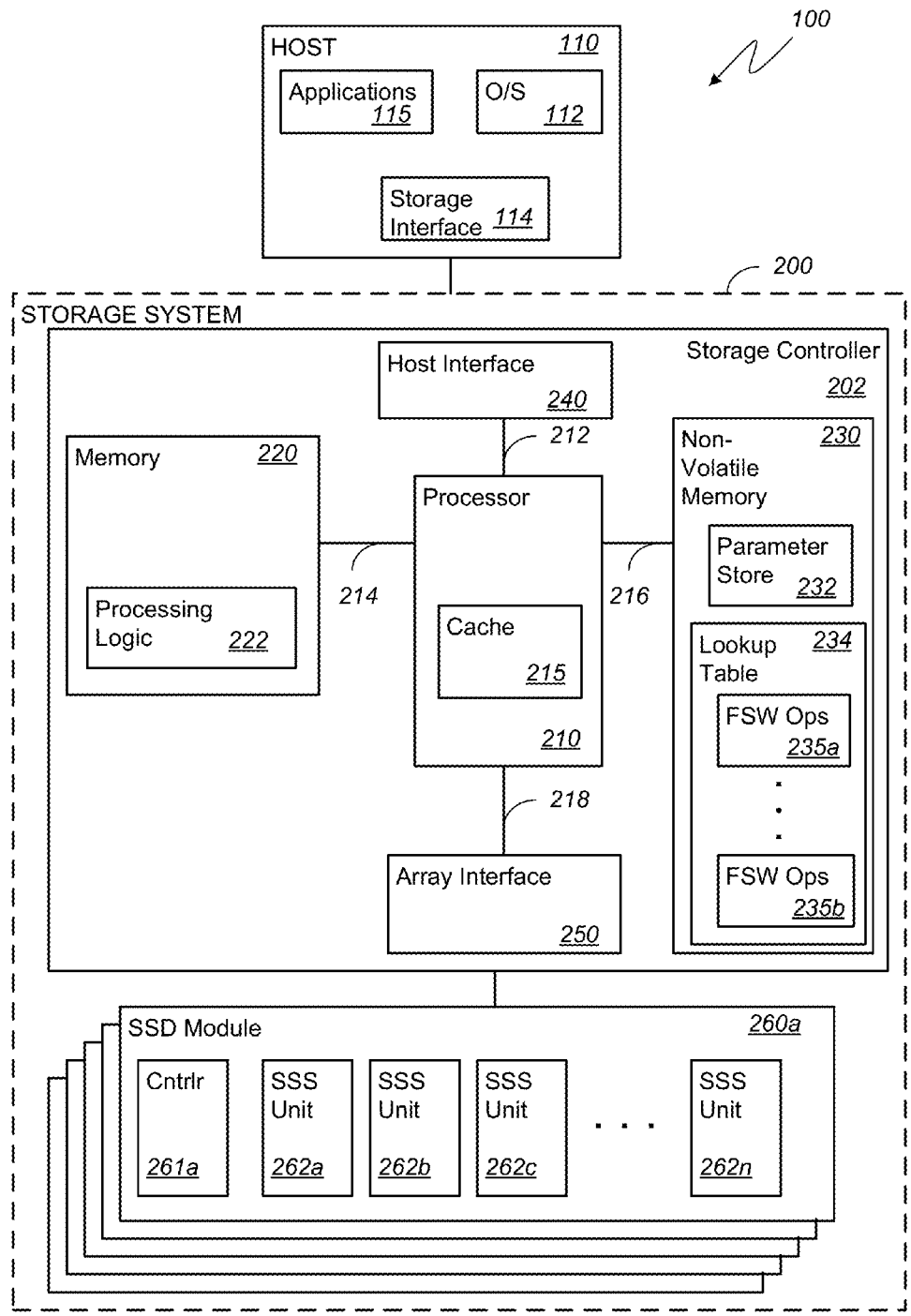
FIG. 1 illustrates a block diagram of an embodiment of a storage system with an improved storage controller in a computing environment.

In accordance with the improved storage system and methods for performing full-stripe write operations to a data volume supported by data storage elements distributed across multiple modules, a storage array layout is defined in response to at least one characteristic of the data to be stored and retrieved from the data volume and in response to a bandwidth of an I/O circuit pipeline that communicates digital data to and from circuit elements that store the data in solid state memory units across the multiple modules. The storage array layout includes a portion of data designated as a block. Each block has a consistent size in bytes. The specific block size is selected in an effort to align data I/O operations between one or more operating systems (O/S) and one or more application level programs to be executed on a host computing device. The storage array layout further includes a sub-portion of a block or chunk. Each chunk has a consistent size in bytes and is smaller than its parent block. The specific chunk size is selected based on the bandwidth of the I/O circuit pipeline that communicates digital data to and from the circuit elements that store the data in the solid state memory units of the multiple modules.

A storage controller is arranged with designated host and data storage media interfaces and includes processing logic and a cache. The processing logic is adaptive to the particular array layout and is arranged to temporarily store data received from a host that is to be stored in the data volume. The received data is collected in a cache until the data present in the cache meets or exceeds the amount of data that can be transferred in a single write operation to the solid state memory units of the multiple modules. The processing logic algorithmically corresponds to the defined array layout and determines the appropriate data to place in a parity chunk corresponding to each stripe in the defined array. The processing logic is adaptive to any integer number of solid state storage units. The most capacity efficient arrangements will meet the condition $2^M+1 \leq N$, where N is the number of separate solid state modules available for the storage array and M is the number of solid state modules that will store non-parity or system data. Accordingly, the most capacity efficient array layouts will use the largest power of 2 that is contained within the available solid state storage modules. In other words storage arrays comprising 3, 5, 9, 17, 33, . . . solid state storage modules will be most capacity efficient.

While the addition of the parity chunk introduces a capacity cost, such storage layouts permit the storage controller to arrange data in a cache and calculate the parity chunk information before transferring data to the solid state storage modules in a single write operation. The storage controller can thus avoid complex serialization and remapping that would otherwise be required when writing data to solid state storage modules.

Under certain circumstances the host and/or the storage controller may dictate a write operation to the data volume that is smaller than the capacity of the embedded full stripe write. Under such conditions, the storage controller may perform a read, modify, and write approach to transfer data to the data volume.

In addition to the above considerations, the storage controller includes logic that will define a set or collection of stripes or a stride that can be accessed and more importantly written from the cache in a single operation. With relatively smaller chunk sizes there is an increased likelihood that I/O operations will address several of the solid state storage modules. Consequently, data to be written to a data volume can be collected and designated for a single write operation to the distributed solid state storage modules in a defined stride. By arranging an array as a set of strides, the storage controller can benefit through the application of large stride writes rather than smaller stripe writes.

Strides are spatially allocated across the storage array. In some arrangements strides can be arranged sequentially over rows or columns of solid state storage units. Depending on how the stride is defined, individual strides may start in a first set of rows or columns and end in a subsequent set of rows or columns, respectively. In other arrangements, strides may be arranged sequentially with a first subset of members of the set in a first row or column and a subsequent subset of members of the set in a second row or column offset in rank from the first row or column.

Attention is now directed to the illustrated embodiments of the improved storage system, storage controller, distributed storage layouts and their use as shown in FIGS. 1-9. FIG. 1 includes a schematic illustration of an example computing environment 100 with a data storage system 200 that applies the above described designs and techniques to efficiently transfer data between a host 110 and a set of solid state storage modules 260a-260n. From the perspective of the host 110, data stored in the storage system 200 appears as one or more logical data volumes even though the data is distributed across set of storage modules with each storage module having a respective set of solid state storage units 262a-262n. Stated another way, the host 110 is aware of one or more logically separated storage locations or letter labeled drives.

Host 110 is a computing device such as server or other computer that functions in accordance with one or more operating system(s) (O/S) 112 and is capable of executing one or more applications 115. Host 110 further includes a storage interface 114 that connects the applications 115 and O/S to the data volume(s) in the data storage system 200. The host 110 may include one or more additional interfaces such as human-to-machine interfaces to support configuration and interaction with an operator of the computing device. The storage interface 114 supports two-way data transfers to one or more of block, character and network devices. Character devices are accessed one byte at a time. Supported operations include get ( ) and put ( ) with more advanced functions such as reading more than one byte being supported by library routines. Block devices are accessed a block at a time. Supported operations include read ( ) write ( ) and seek ( ). These operations are generally conducted by the O/S 112 and include buffering and locking operations. When applications 115 bypass the file system structure provided by the O/S 112, the applications 115 will often manage buffering and locking operations to ensure the integrity of the data transferred between the host 110 and the data storage system 200. Transfers to and from network coupled storage systems are inherently different from transfers to a local data store. One popular mechanism for supporting transfers between network-coupled data stores and a host use a socket interface, which sequentially transfers data. Sockets are normally full-duplex which allows for bi-directional data transfers between the host 110 and the storage system 200.

Storage system 200 includes a storage controller 202 and a set of solid-state data storage modules 260a. Storage controller 202 includes a host interface 240, processor 210, memory 220, a non-volatile memory 230 and an array interface 250. Host interface 240 is arranged to communicate data with the described storage interface 114 and is connected to processor 210 via bus 212. The processor 210 is connected to the memory 220 via bus 214 and is also connected to the non-volatile memory via bus 216. The processor 210 is a hardware device for executing firmware and or software particularly processing logic 222 on the memory 220, which can be supported by a read-only memory element. The processor 210, in accordance with the processing logic 222, is arranged to retrieve a set of parameters from the parameter store 232 and one or more full-stripe write operations or full-stride write operations 235a-235n from a look-up table 234 in the non-volatile memory 230.

As will be explained in further detail, one or more parameters stored in the parameter store 232 can be used to programmatically define the size of a distributed array of storage devices as well as a desired number of separately addressable divisions of the storage capacity provided by the storage devices. For example, a defined array of storage devices may include a desired number of subdivisions arranged in a desired manner that are protected by a data parity operation over the data stored across the subdivisions of the array. The full stripe write or full-stride write operations 235a-235n provided in look-up table 234 include storage controller instructions for writing data to a defined storage array as illustrated and described in the example embodiments presented in FIGS. 2-7.

The processor 210 can be constructed in accordance with a custom made or a commercially available integrated-circuit based processor, or can even be a standalone central processing unit (CPU); an auxiliary processor among several processors associated with PCI-E peripheral device; a semiconductor-based microprocessor (in the form of a microchip or chip set); or generally any device for executing software instructions stored in the memory 220, the non-volatile memory 230 or the cache 215.

In the illustrated embodiment, the cache 215 is shown as residing in the processor 210. It should be understood that the entire cache or portions thereof may be coupled to the processor 210 via a bus (not shown) and may be distributed across one or more separate elements as may be desired. Similarly, it should be understood that the processing logic 222 may be stored in a portion of the cache 215 and/or a portion of the non-volatile memory 230 as may be desired.

The parameter store 232 includes information that defines features of a storage array. These features include a strip data size, a chunk data size and the number of solid-state storage modules to be used in the array. These features will also include a set of arranged stripes distributed in a specified manner across the intended storage array.

The one or more full-stripe write operations 235a-235n and/or full-stride write operations 235a-235n include a set of instructions that when executed by the processor 210 instruct the storage controller 202 to communicate buffered data from the cache 215 via the array interface 250 to place specified data portions in a distributed array supported by the set of solid-state storage modules 260a-260n. In alternative arrangements, the processing logic 222 may include algorithms that when executed by the processor 210 instructs the storage controller 202 to transfer the buffered data to designated portions of the distributed array supported by the storage modules 260a-260n.

The processor 210 uses the cache 215 to buffer data that is to be written to the defined storage array. Once the cache 215 has received a quantity of data that meets or exceeds the quantity of data that matches the capacity of a full-stripe write operation or a full-stride write operation, as indicated by the various parameters, the buffered data is forwarded from the cache 215 via the array interface 250 to the various SSS units 262a-262n across the SSD modules 260a-260n. The illustrated arrangement of SSS units 262 arranged on SSD modules 260 on printed circuit boards or other integrated circuits substrates always provides at least two (or an integer number N of two or more) separately addressable storage elements to the storage controller 202. It should be further appreciated that the storage system 200 is scalable as a desired number of additional SSD modules 260 may be added as storage capacity increases.

As indicated briefly above, the buffered data is segmented logically into blocks and chunks. The specific block size is selected to align data I/O operations to the primary workload of the host 110. In many of today's computing designs, data transfers between the host 110 and the storage system 200 include amounts ranging from 16 kbytes to 64 k bytes. By selecting a block size that evenly subdivides 16 kbytes, data to be transferred can be optimally aligned by the host 110 and/or the storage controller 202 to optimize data transfers between these devices. While these amounts are presently popular, future designs may be configured to transfer other amounts of data between the host 110 and the data storage system 200. The chunk size is selected based on the architecture of the SSD module 260. That is, the chunk size is selected based on the amount of data that can be transferred to a SSS unit 262a-262n by the dedicated controller 261 in a single I/O transaction. Many of today's SSS units 262a-262n receive data across 4 kbyte wide dedicated I/O pipeline or interface that couples the controller 261 to the respective SSS units 262a-262n. While this 4 kbyte I/O bandwidth is common, future designs may support other bandwidths.

Although the illustrated embodiment includes a single host 110, it should be understood that the storage controller 202 can be adaptively scaled to support data transfers between additional hosts including virtual hosts and any number of desired data volumes.

Figure 2:
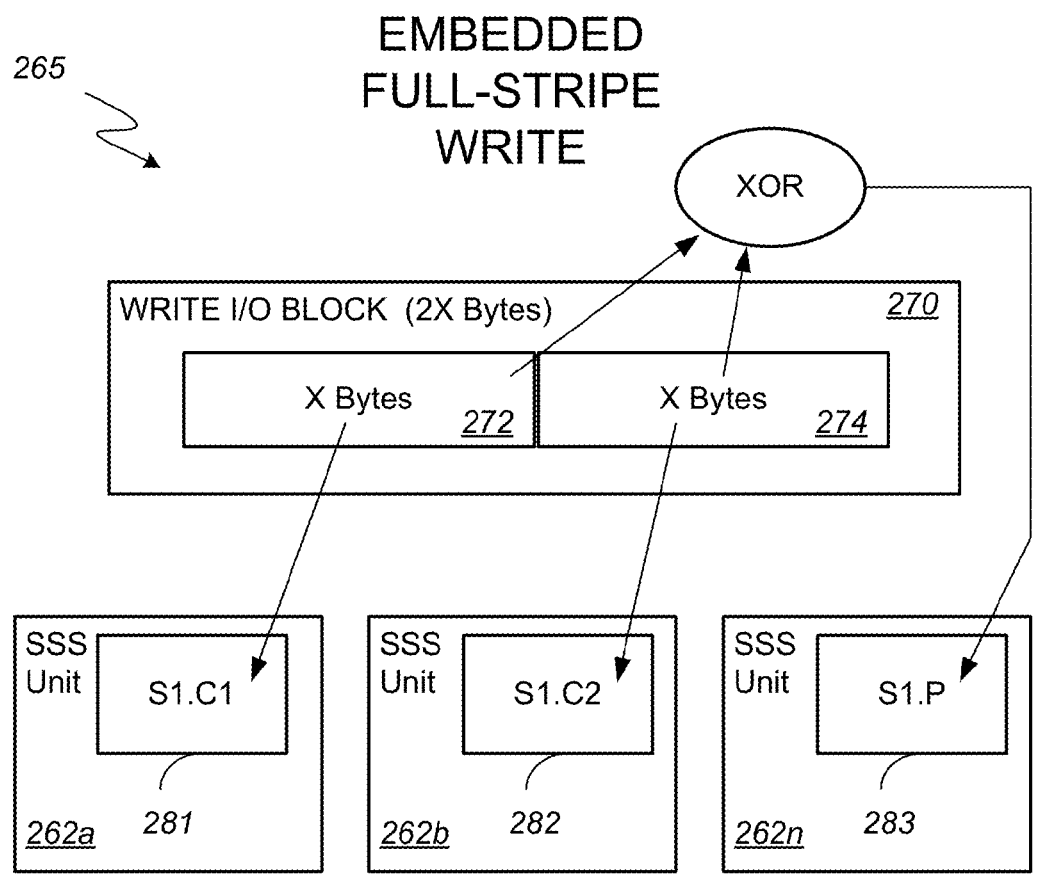
FIG. 2 illustrates a block diagram of an embodiment of an embedded full-stripe write operation as performed by the storage controller of FIG. 1.

FIG. 2 illustrates schematically how the storage controller 202 is arranged to transfer a block of cached or temporarily stored data to a defined array of SSS units 262a-262c, where N is three. In the illustrated embodiment, the write I/O block 270 includes 2X bytes subdivided into a first chunk 272 and a second chunk 274 each having X bytes. In an embedded full-stripe write operation the first chunk 272 is transferred in its entirety to storage location 281 on SSS unit 262a. Storage location 281 is labeled S1.C1 as it is the persistent storage location of the first chunk (C1) of the first strip (S1). Similarly, the second chunk 274 is transferred in its entirety to storage location 282 on SSS unit 262b. Storage location 282 is labeled S1.C2 as it is the persistent storage location of the second chunk (C2) of the first strip (S1). As is further shown, the bytes of the two chunks of block 270 are logically XORed and the result is transferred in its entirety to storage location 283 on SSS unit 262c. Storage location 283 is labeled S1.P as it is the persistent storage location of the parity information that can be used to reconstruct the data in either of the chunk 272 or the chunk 274 of the block 270 should recovery of the data become necessary. In this example embodiment, the I/O data block includes 8 kbytes and each of the chunks includes 4 kbytes with the first chunk 272 including the first 4 kbytes of the block and the second chunk 274 including the remaining 4 kbytes of the I/O data block.

The example full-stripe write operation provides parity protection for the chunks of a stripe. The example operation differs from RAID level 5, in that the present storage controller 202 does not perform read-modify write or read peers parity generation in its standard mode of operation. Unlike RAID level 5, the present storage controller 202 is arranged to cache and write data to the data storage modules in full stripes or multiples of full stripes including the respective parity information. Preferably, the storage controller 202 calculates parity incrementally as each data chunk is aggregated into the stripe and writes when the stripe is full. Thus, intermediate parity results should be preserved until the parity determination is complete and can be written as part of the corresponding stripe.

It is also preferred that each block size matches the size of the data stripe. When this cannot be accomplished, each write operation should be stripe aligned and equal to at least one stripe. Thus, each logical block contains both data and parity information and is both protected and self-contained. That is, each block can be written and protected independently from other logical blocks. In addition, each logical block can be reconstructed independently from other logical blocks.

Figure 3:
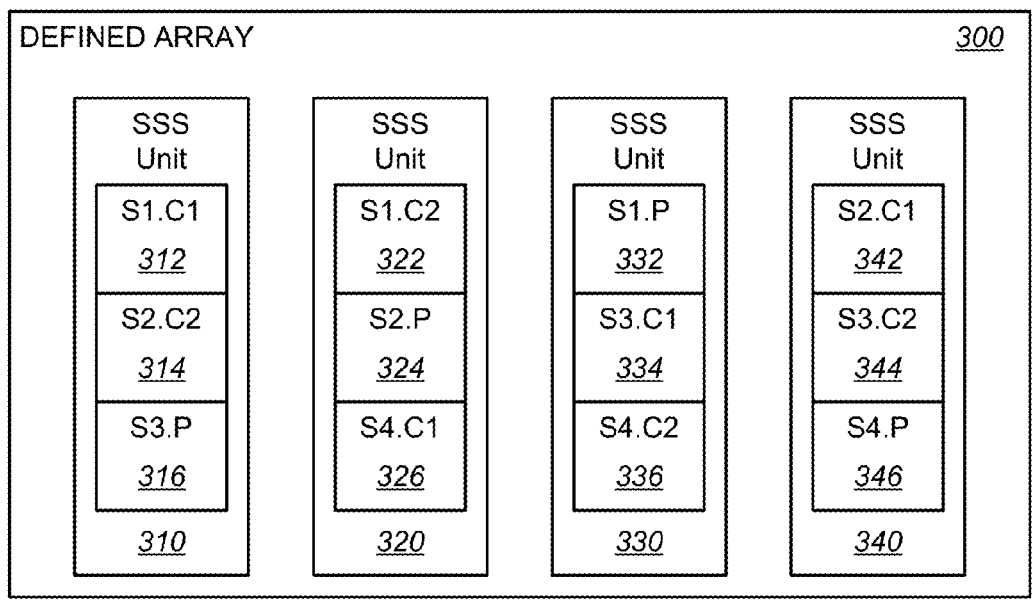
FIG. 3 illustrates a block diagram of an embodiment of a defined array that can be populated with cached data from the storage controller of FIG. 1 in a defined manner.

FIG. 3 illustrates schematically an example defined array 300 of SSS units where the result of four embedded full stripe write operations is shown. The defined array 300 is supported by 4 storage units SSS unit 310, SSS unit 320, SSS unit 330, and SSS unit 340 that include respective data storage capacity to store desired size chunks of I/O blocks. In the illustrated embodiment, SSS unit 310 includes at least three appropriately sized and separately addressable storage locations including storage location 312, storage location 314 and storage location 316. In addition, SSS unit 320 is similarly arranged with storage location 322, storage location 324 and storage location 326. SSS unit 330 is arranged with storage location 332, storage location 334 and storage location 336 and SSS unit 340 is arranged with storage location 342, storage location 344 and storage location 346. As indicated, a first stripe of two data chunks and a parity chunk is sequentially distributed across the respective storage elements of adjacent SSS units 310, 320 and 332 in a first row starting from an origin at storage location 312. Accordingly, the storage locations 312, 322, and 332 provide persistent storage locations for a block segmented as S1.C1, S1.C2, and S1.P. The second stripe begins at storage location 342 and continues from left to right in the second row of the defined array 300. Thus, storage locations 342, 314, and 324 provide persistent storage locations for a block of data segmented as S2.C1, S2.C2, and S2.P. The third stripe begins at storage location 334 and continues from left to right in the second row and third rows of the defined array 300. Thus, storage locations 334, 344, and 316 provide persistent storage locations for a block of data segmented as S3.C1, S3.C2, and S3.P. The fourth stripe begins at storage location 326 and fills the third row of the defined array 300 with storage locations 326, 336 and 346 providing persistent storage locations for a block segmented as S4.C1, S4.C2, and S4.P.

As indicated in FIG. 3, the direct chunk to stripe association can be leveraged to avoid the overhead of complex and memory hungry mapping schemes. Moreover, with support from host drivers the present storage system 200 can provide both higher throughput and lower latency when the transfers are well-aligned with data paths on the SSD modules 260. Similarly, when accessing any chunk, data is transferred from all the separate SSS units 262 used to support the stripe.

Some configurations may require trade-offs between chunk size and block/stripe size. For example, for SSS units on SSD modules with 4 kbyte data pipelines, a storage array with 3 SSS units (including parity) can support a logical block size of 8 kbytes. By way of further example, a storage array with 5 SSS units (including parity) can support a logical block of 16 kbytes or 8 kbytes when the controller 261 supports transfers of 2 kbytes. Alternatively, a storage array with 9 SSS units (including parity) can support a logical block of 16 kbytes when the controller 261 supports transfers of 2 kbytes.

FIG. 4 illustrates schematically an alternative defined array 400 of SSS units where the result of eight embedded full stripe write operations is shown. The defined array 400 is supported by 8 storage units SSS unit 410, SSS unit 420, SSS unit 430, SSS unit 440, SSS unit 450, SSS unit 460, SSS unit 470, SSS unit 470 and SSS unit 480 that include respective data storage capacity to store desired size chunks of I/O blocks. In the illustrated embodiment, SSS unit 410 includes at least five appropriately sized and separately addressable storage locations including storage location 411, storage location 412, storage location 413, storage location 414 and storage location 415. SSS unit 420 is similarly arranged with storage location 421, storage location 422, storage location 423, storage location 424 and storage location 425. SSS unit 430 is similarly arranged with storage location 431, storage location 432, storage location 433, storage location 434 and storage location 435. SSS unit 440 is arranged with storage location 441, storage location 442, storage location 443, storage location 444 and storage location 445. SSS unit 450 is similarly arranged with storage locations 451 through 455, SSS unit 460 is arranged with storage locations 461 through 465, SSS unit 470 is arranged with storage locations 471 through 475 and SSS unit 480 is arranged with storage locations 481 through storage location 485 with each of the separately addressable storage locations arranged in a columnar fashion across the respective SSS units.

As illustrated, a first stripe of four data chunks and a fifth or parity chunk is sequentially distributed across the respective storage elements of adjacent SSS units 410, 420, 430, 440 and 450 in a first row starting from an origin at storage location 411. Accordingly, the storage locations 411, 421, 431, 441 and 451 provide persistent storage locations for a block segmented as S1.C1, S1.C2, S1.C3, S1.C4 and S1.P. The second stripe begins at storage location 461 and continues from left to right in the first and second rows of the defined array 400. Thus, storage locations 461, 471, 481, 412 and 422 provide persistent storage locations for a block of data segmented as S2.C1, S2.C2, S2.C3, S2.C4 and S2.P. The third stripe begins at storage location 432 and continues from left to right in the second row of the defined array 400. Thus, storage locations 432, 442, 452, 462 and 472 provide persistent storage locations for a block of data segmented as S4.C1, S4.C2, S4.C3, S4.C4 and S4.P. The fourth stripe begins at storage location 482 and continues in the third row of the defined array 400 with storage locations 482, 413, 423, 433 and 443 providing persistent storage locations for a block segmented as S4.C1, S4.C2, S4.C3, S4.C4 and S4.P. A fifth stripe of four data chunks and a fifth or parity chunk is sequentially distributed across storage locations 453, 463, 473, 483 and 414 provide persistent storage locations for a block segmented as S5.C1, S5.C2, S5.C3, S5.C4 and S5.P. The sixth stripe begins at storage location 424 and continues from left to right in the fourth row of the defined array 400. Thus, storage locations 424, 434, 444, 454 and 464 provide persistent storage locations for a block of data segmented as S6.C1, S6.C2, S6.C3, S6.C4 and S6.P. The seventh stripe begins at storage location 474 and continues from left to right in the fourth and fifth rows of the defined array 400. Thus, storage locations 474, 484, 415, 425 and 435 provide persistent storage locations for a block of data segmented as S7.C1, S7.C2, S7.C3, S7.C4 and S7.P. The eighth stripe begins at storage location 445 and continues in the fifth row of the defined array 400 with storage locations 445, 455, 465, 475 and 485 providing persistent storage locations for a block segmented as S8.C1, S8.C2, S8.C3, S8.C4 and S8.P.

As indicated, for distributed arrays that include $2^N$ data elements and 1 parity element, the embedded full-stripe write techniques result in a data capacity efficiency equivalent to similarly arranged RAID level 5 arrays. For example, an array with 3 data storage elements will provide a data to stripe ratio of 2/3 or a data capacity efficiency of 66%. An array with 5 data storage elements will provide a data to stripe ratio of 4/5 or a data capacity efficiency of 80%. An array of 9 data storage elements provides a data to stripe ratio of 8/9 or has a data capacity efficiency of 89%.

For other array configurations with other total numbers of storage elements, each stripe is defined to contain separate storage elements from the largest set that can be supported. Thus, an array supported by 4 data storage elements will support a data to stripe ratio of 2/3 and is 66% data capacity efficient. Similarly, arrays that contain 6, 7 or 8 separate data storage elements will support a data to stripe ratio of 4/5 and is 80% data capacity efficient.

Based on the number of data storage elements in the array, the above-described embedded full-stripe write operation will generate stripe sizes of 4 kbytes, 8 kbytes, or even more, which will impose corresponding I/O alignment requirements with applications supported by the host 110. Stated another way, executing applications that do not adhere to data write operations of a similar size could result in poor I/O performance. Consequently, a reduced chunk size may improve performance by providing greater flexibility as more I/O operations will meet the size and alignment guidelines. While at the storage controller level writing one full stripe is an efficient operation, writing only one full stripe at a time may generate a significant number of back-end or overhead operations (one for each storage element in the stripe) to write a relatively small amount of data to a storage medium.

However, when the chunk size is smaller than the bandwidth of the pipeline circuits that provide data to the SSS units 262, an improper alignment of block size to the number of storage elements supporting the stripe will not result in optimum performance as the controller in the SSD module must perform a read-modify write to store data in the data storage media. To mitigate the shortcomings of chunk size that is smaller than the pipeline circuits that connect data to the storage media, multiple adjacent stripes can be aggregated to form a stride (i.e., a set of specified stripes) of a fixed number of $2^M$ consecutive stripes.

Figure 5:
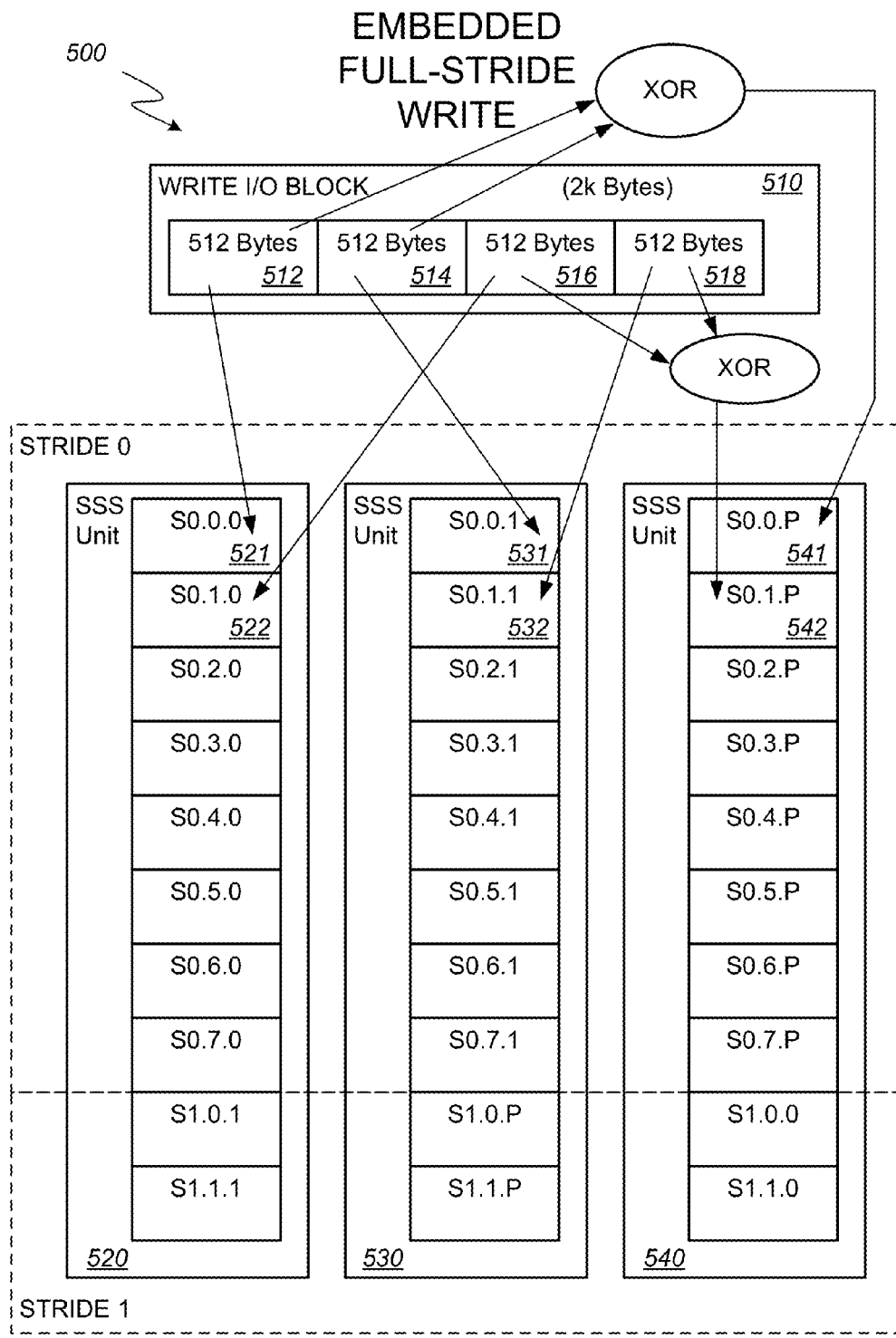
FIG. 5 illustrates a block diagram of still another embodiment of a defined array which shows the array divided into strides.

FIG. 5 illustrates schematically how the storage controller 202 can be modified through alternative configuration parameters to transfer cached or temporarily stored data to a defined array of SSS units 262a-262c, where N is three. In the illustrated embodiment, the write I/O block 510 includes 2 kbytes subdivided into a first chunk 512, a second chunk 514, a third chunk 516 and a fourth chunk 518 with each of the chunks having 512 bytes. In an embedded full-stripe write operation the first chunk 512 is transferred in its entirety to storage location 521 on SSS unit 520. Storage location 521 is labeled 50.0.0 representing a stride, stripe and a chunk in that order, as it is the persistent storage location of the first chunk (0) of the first strip (0) of the first stride (0). Similarly, the second chunk 514 is transferred in its entirety to storage location 531 on SSS unit 530. Storage location 531 is labeled 50.0.1 as it is the persistent storage location of the second chunk (1) of the first strip (0) of the first stride (0) (in reverse order with respect to size). As is further shown, the bytes of the first two chunks of block 510 are logically XORed and the result is transferred in its entirety to storage location 541 on SSS unit 540. Storage location 541 is labeled S0.0.P as it is the persistent storage location of the parity information that can be used to reconstruct the data in chunk 512 or the chunk 514 of the block 510 should recovery of the data become necessary.

In an embedded full-stripe write operation the third chunk 516 is transferred in its entirety to storage location 522 on SSS unit 520. Storage location 522 is labeled S0.1.0 as it is the persistent storage location of stride (0), strip (1) and chunk (0). Similarly, the second chunk 518 is transferred in its entirety to storage location 532 on SSS unit 530. Storage location 532 is labeled 50.1.1 as it is the persistent storage location of stride (0), strip (1) and chunk (1). As is further shown, the bytes of the third and fourth chunks of block 510 are logically XORed and the result is transferred in its entirety to storage location 542 on SSS unit 540. Storage location 542 is labeled S0.1.P as it is the persistent storage location of the parity information that can be used to reconstruct the data in either of the chunk 516 or the chunk 518 of the block 510 should recovery of the data become necessary.

As further indicated in FIG. 5, a first stride labeled stride 0, includes a set of eight stripes with each stripe following the same sequential arrangement of segmented data. A second stride, labeled stride 1, includes a set of two strides with each stripe of the stride including a parity chunk for the pair of related data chunks in SSS unit 530. It should be understood that a host of alternative arrangements for distributing segmented chunks of I/O blocks in stripes and strides are possible. Each alternative arrangement may closely align with one or more particular host application data transfers.

In the embodiment illustrated in FIG. 5, chunks with the same logical number (e.g. 0, 1, P) are transferred to the same storage element. Preferably, the combined size of the chunks in a stride is equal to a supportable data transfer from the storage controller 202 to the set of separate storage elements supporting the defined storage array. When all stripes are available, only a single write operation is needed to write all chunks as a read-modify-write operation is not required to reliably transfer the data to the data volume. For a chunk size of 512 bytes, minimal stride sizes varying from 8 kbytes to 32 kbytes are supportable, depending on configuration. It should be understood that stride sizes are scalable and may be set higher as may be desired.

FIG. 6 illustrates a block diagram of an embodiment of a defined array 600 with one example stride allocation arrangement. In the example defined array 600 a set of stripes arranged in a stride of three stripes of five SSS units are arranged in a planar manner that coincides with the left to right register of ranks of storage locations across the separate SSS units. As illustrated the defined array is supported by eight SSS units 601-608 arranged from left to right. Thus, the separately addressable storage locations associated with each SSS unit is arranged in a columnar manner. A first stride 610 of three stripes consumes the storage locations provided along the first three storage elements of the SSS unit 601 through SSS unit 605 with the parity chunks for the three stripes arranged in SSS unit 605. Each separately addressable storage location is labeled with three characters representing a stride identifier, a stripe identifier, and a chunk or parity identifier in that order from left to right. A second stride (not specifically marked) is arranged in the storage locations provided in the first three rows of the remaining SSS units 606-608 and in rows 4 through 6 of the SSS unit 601 and SSS unit 602. Accordingly, a third stride identified by a dashed line consumes the storage locations provided along rows 4 through 6 of the SSS unit 603 through SSS unit 607. A fourth stride begins in rows 4 through 6 of SSS unit 608 and resumes in rows seven through 9 of SSS unit 601 through SSS unit 604. A fifth stride begins in rows 7 through 9 of SSS unit 605 through SSS unit 608 with the parity chunks in rows 10 through 12 of SSS unit 601. A sixth stride marked with a dished line consumes the storage locations in rows 10 through 12 of SSS unit 602 through SSS unit 606. A seventh stride consumes the storage locations in rows 10 through 12 of SSS unit 607 and SSS unit 608 and resumes in rows 13 through 15 of SSS unit 601 through SSS unit 603. An eighth stride 618 marked with a dashed line consumes the storage locations in rows 13 through 15 of SSS unit 604 through SSS unit 608.

FIG. 7 illustrates a block diagram of an embodiment of a defined array 700 with an alternative stride allocation arrangement. In the example defined array 700 a set of stripes arranged in strides of three stripes of five SSS units are arranged in an offset and diagonal manner with respect to the ranks of storage locations across the separate SSS units. As illustrated, the defined array 700 is supported by eight SSS units 701-708 arranged from left to right. Thus, the separately addressable storage locations associated with each SSS unit is arranged in a columnar manner. A first stride, labeled Stride 0 and shaded in 40% greyscale, consumes the storage locations provided along the first three storage elements of the SSS unit 701, the fourth through sixth storage elements from the uppermost storage unit of SSS unit 702, the seventh through ninth storage elements of SSS unit 703, the tenth through twelfth storage elements of SSS unit 704 and parity chunks for the three stripes arranged in the thirteenth through fifteenth storage elements of SSS unit 705, respectively. Each separately addressable storage location is labeled with three characters representing a stride identifier, a stripe identifier, and a chunk or parity identifier in that order from left to right.

A second stride (unlabeled) consumes the storage locations provided along the first three storage elements of the SSS unit 702, the fourth through sixth storage elements from the uppermost storage unit of SSS unit 703, the seventh through ninth storage elements of SSS unit 704, the tenth through twelfth storage elements of SSS unit 705 and parity chunks for the three stripes arranged in the thirteenth through fifteenth storage elements of SSS unit 706, respectively.

A third stride, labeled Stride 2 and identified by 20% greyscale shading, consumes the storage locations provided along the first three storage elements of the SSS unit 703, the fourth through sixth storage elements from the uppermost storage unit of SSS unit 704, the seventh through ninth storage elements of SSS unit 705, the tenth through twelfth storage elements of SSS unit 706 and parity chunks for the three stripes arranged in the thirteenth through fifteenth storage elements of SSS unit 707, respectively.

A fourth stride (unshaded) consumes the storage locations provided along the first three storage elements of the SSS unit 704, the fourth through sixth storage elements from the uppermost storage unit of SSS unit 705, the seventh through ninth storage elements of SSS unit 706, the tenth through twelfth storage elements of SSS unit 707 and parity chunks for the three stripes arranged in the thirteenth through fifteenth storage elements of SSS unit 708, respectively.

A fifth stride, labeled Stride 4 and marked with slanted lines, consumes the storage locations provided along the first three storage elements of the SSS unit 705, the fourth through sixth storage elements from the uppermost storage unit of SSS unit 706, the seventh through ninth storage elements of SSS unit 707, the tenth through twelfth storage elements of SSS unit 708, respectively. The parity chunks for the three stripes are arranged in the thirteenth through fifteenth storage elements of SSS unit 701, respectively.

A sixth stride (unlabeled) consumes the storage locations provided along the first three storage elements of the SSS unit 706, the fourth through sixth storage elements from the uppermost storage unit of SSS unit 707 and the seventh through ninth storage elements of SSS unit 708, respectively. The stride continues with the tenth through twelfth storage elements of SSS unit 701. The parity chucks for the three stripes are arranged in the thirteenth through fifteenth storage elements of SSS unit 702, respectively.

A seventh stride, labeled Stride 6 and identified by vertically arranged fill lines, consumes the storage locations provided along the first three storage elements of the SSS unit 707 and the fourth through sixth storage elements from the uppermost storage unit of SSS unit 708, respectively. The stride continues with the seventh through ninth storage elements of SSS unit 701 and the tenth through twelfth storage elements of SSS unit 702. The parity chunks for the three stripes are arranged in the thirteenth through fifteenth storage elements of SSS unit 703, respectively.

An eighth stride (unshaded) consumes the storage locations provided along the first three storage elements of the SSS unit 708 and continues with the fourth through sixth storage elements from the uppermost storage unit of SSS unit 701, the seventh through ninth storage elements of SSS unit 702, and the tenth through twelfth storage elements of SSS unit 703. The parity chunks for the three stripes are arranged in the thirteenth through fifteenth storage elements of SSS unit 704, respectively.

The storage controller 202 can be configured with various algorithms in processing logic 222 to populate the defined array 600 in FIG. 6, the defined array 700 shown in FIG. 7, or any other desired arrangement of sets of stripes as may be desired.

As indicated above, the embedded full-stripe write methodology imposes specific guidelines on stride and stripe alignment and size. Given these guidelines, the storage controller 202 logically arranges data in chunks in several different ways. When chunks and data to be written thereto are stride aligned and equal to the stride size (8 kbytes for up to 5 data storage elements and 16 kbytes for up to 8 data storage elements), parity is calculated with a single XOR and data is written with a single write operation to a particular storage element in the array. When chunks are stripe aligned and equal to one or more stripes but less than a stride, parity is calculated with just one XOR and data is written with one operation per storage element. However, since the single write operation is less than a full stride, each storage element involved must also perform a read-modify write. When chunks are less than a stripe and are designated for persistent storage (e.g., just before a host shutdown), parity will be calculated as a result of either a read-modify-write or a read peers sequence. Two back-end write operations are issued. A write is issued to the data chunk storage element and to the parity storage element, which is followed up by a read-modify-write for both storage elements.

Figure 8:
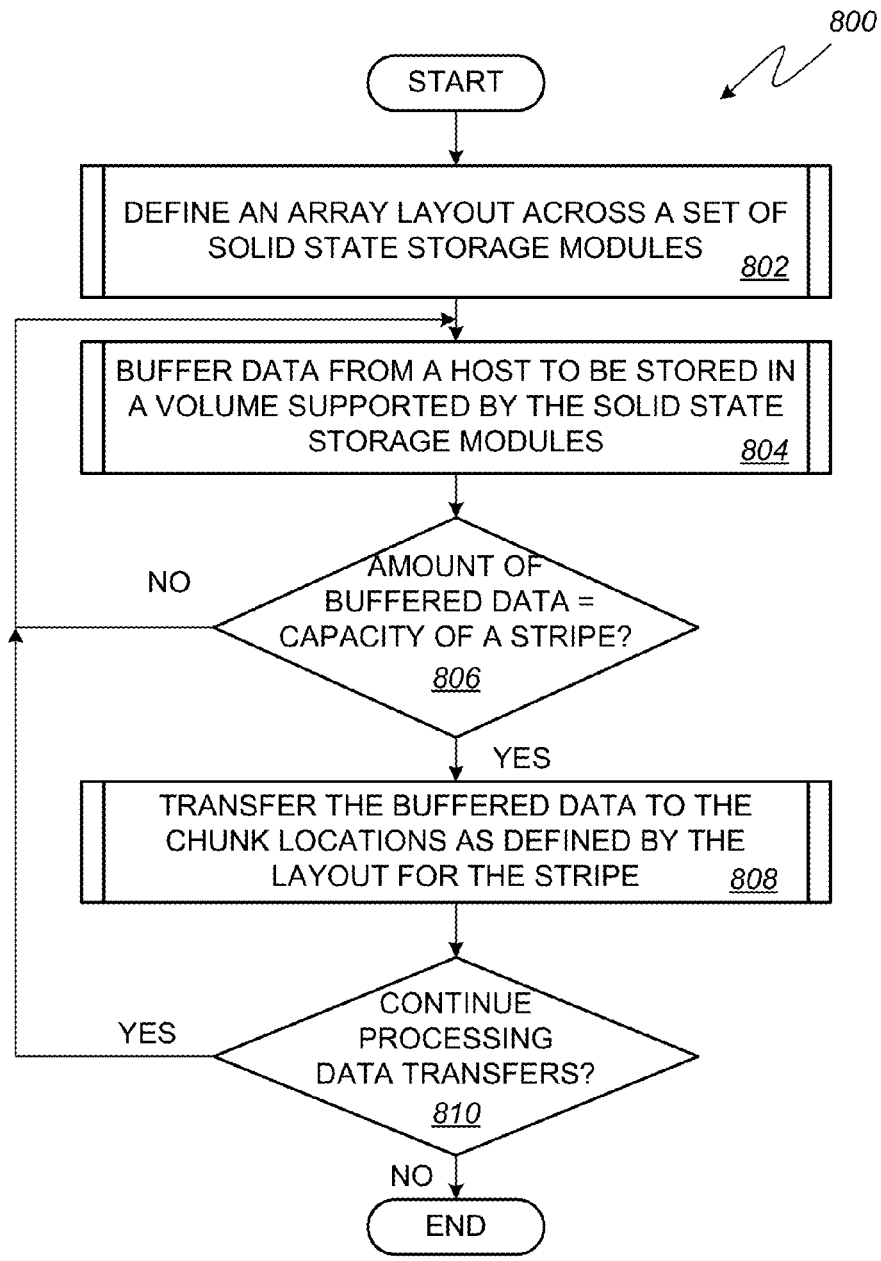
FIG. 8 illustrates a flow diagram of an embodiment of a method for processing data between a host and a data volume.

FIG. 8 illustrates a flow diagram of an embodiment of a method 800 for processing data between a host 110 and a logical data volume exposed by the storage system 200. The method 800 begins with block 802 where an array layout or distributed storage structure is defined across a set of N solid state storage modules. In block 804, data to be stored in the logical data volume is buffered by a storage controller. In decision block 806, a determination is made whether the capacity of the data to be stored that is presently in a cache coupled to the storage controller is equal to a data storage capacity of a stripe of the defined array. When the cache does not contain enough data to be stored to support a full-stripe write in a single operation to the N solid state storage modules, as indicated by the flow control arrow labeled "No" exiting decision block 806 processing continues with block 804. Otherwise, when the cache contains enough data to support a full-stripe write, the storage controller 202 communicates the buffered data from the cache to the chunk storage locations as defined for the layout for the stripe as shown in block 808. Thereafter, a determination is made in decision block 810 whether to continue processing data transfers from the host 110 to the logical data volume via the storage controller 202. When it is determined that additional write data operations are to be performed, processing continues by repeating the functions illustrated in blocks 802-810. Otherwise, when it is determined that the system should be shut down the method 800 terminates.

Figure 9:
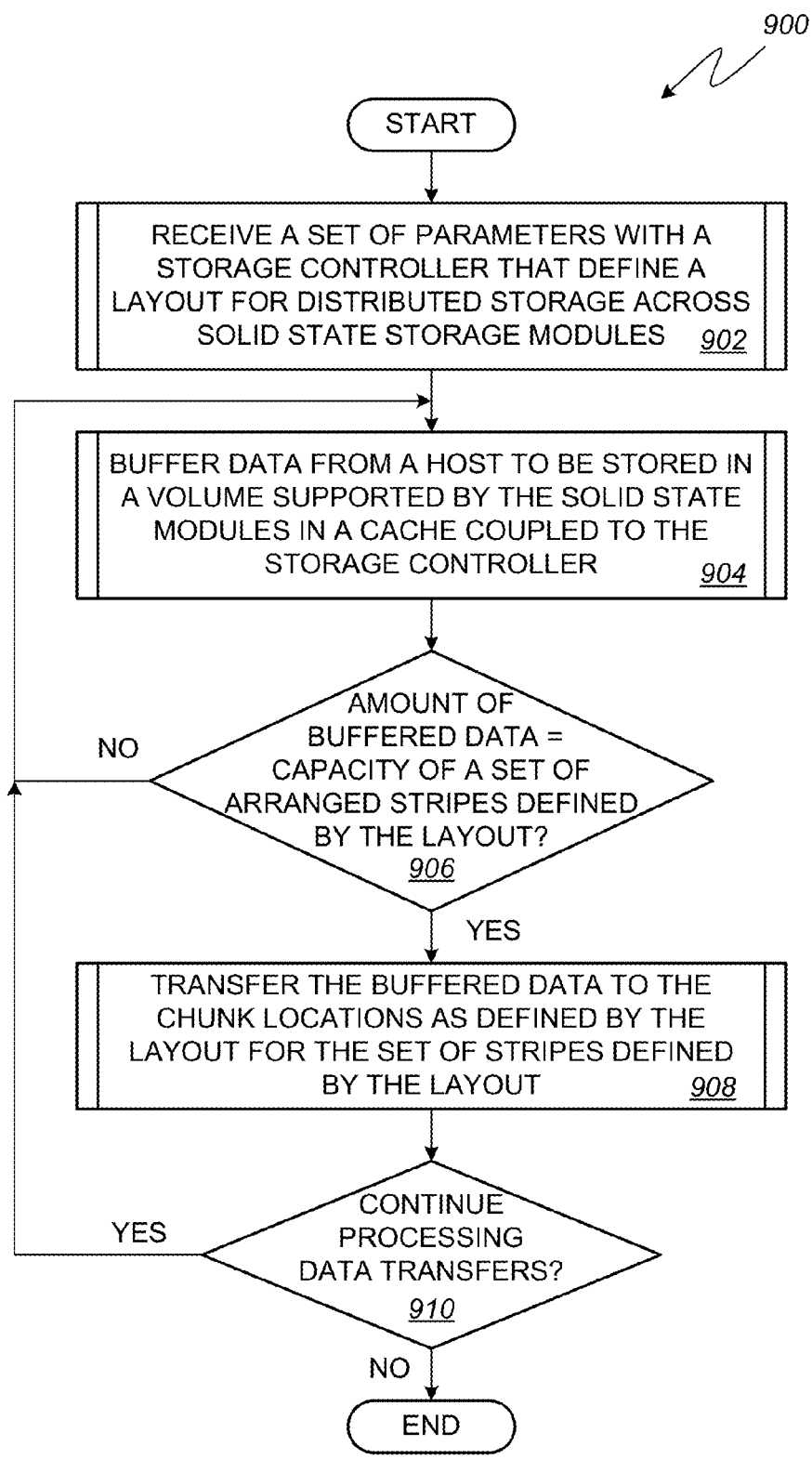
FIG. 9 illustrates a flow diagram of an alternative embodiment of a method for processing data with a storage controller.

FIG. 9 illustrates a flow diagram of an alternative embodiment of a method 900 for processing data with a storage controller 202. The method 900 begins with block 902 where a set of parameters are received by a storage controller. The parameters define an array layout or distributed storage structure that is defined across a set of N solid state storage modules. In block 904, data to be transferred from the host 110 and stored in the logical data volume is buffered in a cache coupled to and under the control of a storage controller. In decision block 906, a determination is made whether the capacity of the data to be stored that is presently in a cache coupled to the storage controller is equal to a data storage capacity of a stripe of the defined array. When the cache does not contain enough data to be stored to support a full-stripe write in a single operation to the N solid state storage modules, as indicated by the flow control arrow labeled "No" exiting decision block 906, processing continues with block 904. Otherwise, when the cache contains enough data to support a full-stripe write, the storage controller 202 communicates the buffered data from the cache to the chunk storage locations as defined for the layout for the stripe as shown in block 908. As illustrated and described in accordance with the embodiments in FIG. 6 and FIG. 7, the defined array may include a set of strides with each separate stride defined as a specific set of stripes. Thereafter, a determination is made in decision block 910 whether to continue processing data transfers from the host 110 to the logical data volume via the storage controller 202. When it is determined that additional write data operations are to be performed, processing continues by repeating the functions illustrated in blocks 904-910. Otherwise, when it is determined that the system should be shut down the method 900 terminates.

It should be noted that although the system and methods for performing embedded full-stripe write operations to a data volume supported by multiple storage modules have been described with reference to illustrative embodiments, the system and methods are not limited to these embodiments. Those skilled in the art will understand the manner in which these and other modifications can be made to the embodiments described herein.

The invention claimed is:

1. A data storage system, comprising:
a cache memory; and
a controller comprising processing logic that is configurable to define and manage data transfers to and from at least one logical volume to be exposed to a host device, the data transfers as managed by the controller including data aligned for a single write operation to a stride in a defined array of N solid state storage modules, where N is a positive integer that is greater than or equal to 2, each stride comprising a set of two or more arranged stripes and being capable of being transferred by the controller to the N solid state storage modules in a single write operation, each stripe comprising data bits and parity bits generated from the data bits, the defined array having a specifically-defined layout in which the stripes are distributed across the N solid state storage modules in a manner dictated by the layout, wherein the data to be transferred by the controller is collected in the cache memory until the data present in the cache memory meets or exceeds the storage capacity of the stride, and wherein when the data present in the cache memory meets or exceeds the storage capacity of the stride, the controller causes the data present in the cache memory to be transferred to the N solid storage modules in a single write operation in accordance with the specifically-defined layout of the defined array.

2. The data storage system of claim 1, wherein the N solid states modules are coupled to the controller via dedicated interfaces.

3. The data storage system of claim 1, wherein the N solid state modules are integrated on a printed circuit.

4. The data storage system of claim 1, wherein the set of arranged stripes is spatially allocated across at least a portion of the N solid state storage modules, said at least two stripes being segmented in blocks and chunks, the controller directing the transfer of the data from cache memory to said at least a portion of the N solid state storage modules in a one-to-one manner with each chunk and a parity chunk being stored in a respective solid storage module, and wherein the blocks have a data storage capacity that is greater than the bandwidth of an I/O circuit pipeline that communicates digital data to and from the circuit elements that store the data in the solid state memory units.

5. The data storage system of claim 4, wherein the chunks have a data storage capacity that is equal to the bandwidth of the I/O circuit pipeline that communicates digital data to and from the circuit elements that store the data in the solid state memory units.

6. The data storage system of claim 5, wherein the set of arranged stripes is arranged in a sequential manner across the N solid state storage modules.

7. The data storage system of claim 5, wherein the set of arranged stripes is arranged in a planar manner across the N solid state storage modules.

8. The data storage system of claim 1, wherein the host includes executable code that when executed by a processor coupled to the host enable operating system level functions with data processed by the controller.

9. The data storage system of claim 1, wherein the host includes executable applications that operate in accordance with an input received via an interface, the executable applications, when executed by a processor coupled to the host, enable application level interaction with data processed by the controller.

10. The data storage system of claim 9, wherein the interface is a human-to-machine interface.

11. A method for processing data between a host and a data volume implemented by a controller, the method comprising:

defining a layout across a set of N solid state modules, the layout including multiple strides, each stride having at least two arranged stripes;

storing, in cache memory, data received from a host that is to be stored in a data volume in the set of N solid state modules;

determining, with the controller, when an amount of the data stored in the cache memory is equal to or exceeds the storage capacity of a stride having a set of stripes defined in the layout; and when the amount of data stored in the cache memory is equal to or exceeds the storage capacity of the stride, transferring the data from the cache memory to the N solid state modules in a single write operation.

12. The method of claim 11, wherein the layout defines a data storage capacity of a block as a function of the bandwidth of an I/O circuit pipeline that communicates digital data to and from circuit elements that store the data in solid state memory units in the N solid state modules.

13. The method of claim 11, wherein the layout defines a data storage capacity of a chunk that is equal to the bandwidth of an I/O circuit pipeline that communicates digital data to and from circuit elements that store the data in solid state memory units in the N solid state modules.

14. The method of claim 11, wherein the set of arranged stripes is arranged in a sequential manner across the N solid state storage modules.

15. The method of claim 11, wherein the set of arranged stripes is arranged in a planar manner across the N solid state storage modules.

16. A non-transitory storage medium including a set of instructions, said set of instructions adapted to be executed by a storage controller to enable a method for performing embedded full-stripe write operations to a data volume distributed across multiple solid-state storage modules, the instructions comprising:

instructions for receiving, with a storage controller, a set of parameters that define a layout for distributing data across a set of N solid state storage modules, where N is a positive integer that is greater than or equal to 2, the layout defining multiple strides, each stride having a set of at least two stripes;

instructions for storing, in a cache memory coupled to the storage controller, data received from a host that is to be stored in the set of N solid state modules;

instructions for determining when an amount of data stored in the cache memory is equal to or exceeds the storage capacity of a stride defined by the layout; and instructions for causing the controller to transfer the data stored in the cache memory to from the cache memory to the N solid state modules in a single write operation when a determination is made that the amount of data stored in the cache memory is equal to or exceeds the storage capacity of the stride defined by the layout.

17. The non-transitory storage medium of claim 16, wherein each stride is spatially distributed across less than all members of the set of N solid state modules the contents of which are filled in a single write operation by the storage controller.

* * * * *